Patented June 5, 1928.

1,672,465

UNITED STATES PATENT OFFICE.

BERRY MARVEL O'HARRA, OF WESTFIELD, NEW JERSEY, ASSIGNOR TO AMERICAN SMELTING AND REFINING COMPANY, OF NEW YORK, N. Y., A CORPORATION OF NEW JERSEY.

PROCESS FOR DESILVERIZING LEAD BULLION.

No Drawing. Application filed February 9, 1927. Serial No. 167,068.

This invention relates to a process for desilverizing lead bullion, and more particularly to a process for treating the dross obtained in the desilverization of lead bullion and recovering silver therefrom.

The invention further relates to a method of treating such dross whereby the amount of material that must go through certain steps of the process, the amount of by-products which must be resmelted and re-subjected to refining and desilverization processes, and the amount of metals continually tied up in process are reduced to a minimum.

The invention further consists in the new and novel features of operation and the new and original arrangements and combinations of steps in the process hereinafter described and more particularly set forth in the claims.

The composition of the dross obtained in refining lead bullion may vary widely depending upon the composition of the bullion treated and the exact desilverizing procedure followed, but a typical example of the dross obtained from fairly high-grade bullion is as follows: Silver, 12 per cent; zinc, 30 per cent; lead, 50 per cent; with minor percentages of various impurities, oxides, etc. The dross resulting from the desilverization of lower grade bullions will contain smaller proportions of silver and zinc and a correspondingly higher proportion of lead.

In the process of treating the above described dross in which it is broken up and charged into externally heated graphite retorts holding about 1300 pounds, and is subjected to a temperature sufficient to volatilize the zinc contained therein, the zinc is condensed in suitable condensers attached to the mouths of the retorts and is recovered for re-use in desilverizing additional lead bullion. The residual molten metal remaining in the retorts then consists of lead and silver with minor amounts of impurities. In the case of dross of the composition above given the residual metal after distillation of the zinc would contain approximately 17 per cent silver, the remainder being principally lead.

No mention has been made of gold, although it may constitute an important part of the value of the dross, since its amount in percentage is small. The gold follows the silver throughout the treatment herein described, and whenever the word silver is used it is to be understood as including the accompanying gold.

The above mentioned lead-silver alloy remaining after the distillation of zinc from the dross is, according to ordinary practice, charged into small shallow reverberatory furnaces known as cupels, where it is subjected to a blast of air directed over its surface while it is maintained at a bright red heat. This air blast oxidizes the lead in preference to silver, forming litharge, which floats on top of the metal and is skimmed off as rapidly as formed. Other impurities such as arsenic, antimony, tin, copper and bismuth, which may be present in minor amounts, are also largely oxidized, dissolve in the litharge, and are skimmed off with it. This treatment is continued until substantially all the lead and impurities have been oxidized, and removed, leaving only metallic silver along with the gold which has accompanied it through the process. This metal is then cast into suitable molds and subjected to further treatment, which need not be described here, for the separation and further refining of the gold and silver.

The litharge resulting from the cupellation treatment just described contains, in addition to lead, the impurities that enter it in the manner above-mentioned, and also a certain amount of silver, since although the oxidation of lead takes place largely in preference to that of silver the separation is not complete. This litharge must be resmelted for the recovery of its lead and silver content in the form of bullion, and the resulting by-product bullion must be re-passed through the refining and desilverization processes for the elimination of the impurities and the separation of the silver contained in it.

It is obvious from the above description that the necessity of passing a large amount of lead through the zinc distillation retorts, then oxidizing the lead in the cupels, resmelting the litharge thus formed, and refining and desilverizing the bullion resulting from the resmelting of the litharge, involves great expense, and it is evident that if the lead could by inexpensive means be separated from the zinc and silver before the latter are charged to the retorts, a very large part of this expense would be saved.

It is generally known that the zinc and silver exist in the dross as an alloy but that most of the lead present is merely mechanically entangled between the crystals of zinc-silver alloy and contaminating films of zinc and lead oxide. Various methods have been suggested for liquating the dross at a comparatively high temperature to allow the mechanically entangled lead to separate from the zinc-silver alloy, but these have not met with success because of the fact that films of oxide already existing in the dross or formed in it during the liquation process prevent the disentangling and coalescence of the metals in the dross, so that a proper separation between the lead and the zinc-silver alloy cannot be brought about.

The present invention, however, makes it possible to overcome the detrimental effect of the oxides in the dross and to carry on the liquation at such a temperature that a perfectly fluid melt is obtained, in which condition the dross separates cleanly into two liquid layers, just as for illustration, chloroform and water separate into two layers at ordinary temperatures. The upper layer has a high melting-point as compared to lead, and solidifies into a hard crystalline alloy when cooled; it consists almost entirely of silver and zinc. The lower layer has a lower melting-point and solidifies into a soft, malleable alloy; it consists chiefly of lead and contains only small amounts of silver and zinc as compared to the original dross.

The above result may be accomplished by melting the dross in the presence of a substance which will dissolve the oxides present to form a fluid slag at the temperatures used. This slag being fluid can readily separate from the metallic portion of the dross when the temperature is raised above the melting-point of the latter, and any metallic particles that may have been held enmeshed in films of oxide are thus freed and allowed to coalesce to form a molten metallic bath which is free to follow its natural tendency to separate into a layer largely composed of zinc and silver and one consisting principally of lead. The liquid slag formed floats on top of the metallic bath and protects it from further oxidation. Fused anhydrous zinc chloride is especially efficient in dissolving the oxides present in the dross and accomplishing the above-described results, but any other substance which will dissolve the oxides in the dross and form a fluid slag may be used if desired. The amount of zinc chloride or other oxide-dissolving substance which must be used will vary with the amount of oxides present in the dross to be treated, but ordinarily between one and ten per cent will be required.

In the practice of this invention, the dross to be treated may be charged into a suitable melting furnace together with a small amount of zinc chloride or other oxide-dissolving substance and the temperature raised until the whole mass becomes completely molten. This will generally take place at a temperature below a bright red heat. After the charge has melted the upper layer and lower layer may be separately tapped in the liquid condition, or the upper layer may be allowed to solidify and removed while the lower layer is still liquid, or the whole charge may be tapped into a suitable mold and the two layers separated after they have both solidified.

Various forms of melting apparatus such as a reverberatory furnace, a retort, an externally fired muffle, or an electric furnace may be used in this process, although a melting apparatus in which combustion gases do not come in contact with the charge is preferable since the danger of loss of zinc or zinc chloride by volatilization is thus greatly diminished.

The following results illustrate a specific example of the separation that may be effected by the present invention.

Parkes dross containing 3,776 oz. silver per ton and 29.2 per cent zinc, the remainder being chiefly lead, was melted with the addition of ten per cent of its weight of zinc chloride. The melt was allowed to solidify and the resulting two layers, which were separated by a sharp dividing line, were sampled and assayed. The upper, hard and crystalline, layer contained 8,154 oz. silver per ton and 61.5 per cent zinc and the lower, soft and ductile, layer contained 289.5 oz. silver per ton and 3.6 per cent zinc, the remainder being mainly lead.

In the further practice of this invention, the lower layer, consisting of lead with minor amounts of silver and zinc, may be returned to the desilverizing process. This metal contains sufficient zinc to cause its silver content to enter the dross when subjected to ordinary desilverizing procedure, consequently no additional zinc need be added, and the complete desilverization of the metal involves small expense.

The upper layer, consisting chiefly of zinc and silver, may be broken up and charged into graphite retorts and its zinc content may be distilled and recovered in the usual manner. Since this rich, zinc-silver alloy occupies less than half the volume of the original dross, at least half of the retorts used in ordinary practice may be dispensed with, thus approximately halving the retorting cost.

After the zinc in the alloy has been distilled the residual metal remaining in the retorts, instead of consisting largely of lead with, say 17 per cent silver, consists principally of silver, with only a small amount of lead. This alloy may be charged into cupels and the lead oxidized to litharge in the usual way. Because of the small amount of lead to be oxidized, the operation takes only a fraction of the time required in ordinary practice, and the greater part of the cupel capacity ordinarily required can be dispensed with, thus reducing the cupelling cost very greatly. Furthermore, because of the small amount of lead to be oxidized, the amount of litharge produced is very small, consequently the greater part of the cost ordinarily involved in resmelting litharge, and in refining and desilverizing the by-product bullion produced from it, is saved.

By means of this invention a considerable saving in the cost of retorting and an even greater saving in the cost of cupelling and re-treating by-products is effected.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of separating lead from a mixture of lead, zinc and silver which comprises melting said mixture, adding a metal halide capable of dissolving oxides thereto allowing metal oxides to dissolve and to form a slag, and allowing said mixture to separate into two layers having a well defined dividing line, the upper layer consisting largely of zinc and silver and having a high melting-point as compared to lead and the lower layer consisting largely of lead, separately removing said layers and further treating each of said layers for the recovery of the above-mentioned metals.

2. The process of separating lead, zinc and silver contained in a dross resulting from the desilverization of lead which comprises melting said dross in the presence of a metal halide capable of dissolving oxides, allowing said metals to separate into two layers, the upper layer having a higher melting-point than the lower layer and consisting largely of zinc and silver, the lower layer consisting largely of lead, allowing the metals to cool whereby the upper layer solidifies into a hard, crystalline alloy and the lower layer produces a soft, malleable alloy, separating said layers and recovering the metals therein.

3. The process of separating metals contained in a dross resulting from the desilverization of lead which comprises melting said dross in the presence of fused anhydrous zinc chloride whereby any oxides present may be dissolved, allowing the metals to separate into a plurality of layers and recovering the metal values of each layer.

4. The process of recovering metals from a dross obtained in the desilverization of lead which comprises melting said dross in the presence of from one to ten per cent of fused anhydrous zinc chloride whereby oxides may be dissolved, allowing said metals to separate into a plurality of layers and recovering the metal values of each layer.

5. The process of separating metals having different specific gravities from mechanical mixtures thereof which comprises melting said metals, introducing a metal halide thereto for dissolving any oxides present therein, allowing said molten metals to divide into a plurality of layers, and separating said layers.

6. The process of separating metals having different specific gravities from mechanical mixtures thereof which comprises heating said metals in the presence of zinc chloride to produce a fluid melt whereby any oxides present in the metals may be removed, allowing the de-oxidized metals to separate into a plurality of layers, and separately removing said layers.

7. The process of refining metals having different melting points which comprises melting said metals, adding fused zinc chloride thereto whereby oxides are dissolved and a slag is produced, causing said slag to float upon the surface of said molten metals, allowing the metals to separate into a plurality of layers having different melting-points, and separately removing each of said layers.

8. The process of separating lead from a mixture of lead, zinc and silver which comprises melting said mixture, adding a reagent thereto capable of dissolving oxides, causing the mixture to separate into two layers, one of said layers being composed largely of lead, the other of said layers being composed largely of zinc and silver, and selectively removing said layers.

9. The process of separating lead from a mixture of lead, zinc and silver which comprises melting said mixture, adding zinc chloride thereto whereby metal oxides are caused to form a slag and float upon the surface of said molten material and re-oxidation of said metals is prevented, causing the lead to separate from the zinc and silver as a distinct layer, and separately removing said layer.

10. The process of desilverizing a mixture of lead, silver and zinc which comprises melting said mixture in the presence of a material capable of uniting with metal oxides to form a slag, allowing said slag to float upon the surface of the molten metals whereby re-oxidation is prevented, causing the lead to separate from the zinc and silver as a distinct layer, selectively removing said layers, removing the zinc from the zinc-silver layer, and recovering the silver therefrom.

11. The process of desilverizing a mixture of lead, zinc and silver which comprises melting said metals in the presence of an oxide-dissolving agent, separating the lead from the zinc and silver by gravity whereby distinct layers are formed, removing the layer comprising zinc and silver, and removing the zinc therefrom by distillation whereby a residue is produced composed largely of silver.

12. The process of desilverizing a mixture of lead, zinc and silver which comprises melting said metals in the presence of an oxide-dissolving agent, separating the lead from the zinc and silver by gravity whereby distinct layers are formed, removing the layer comprising zinc and silver, and removing the zinc therefrom by distillation whereby a residue is produced composed largely of silver and containing a small proportion of lead, and oxidizing the lead in said residue to form litharge.

13. The process of recovering silver from a mixture of zinc, silver and lead which comprises melting said mixture in the presence of zinc chloride whereby metal oxides are dissolved and a slag is produced, allowing said slag to float upon the surface of said mixture whereby reoxidation of said metals is prevented, allowing said mixture to separate into two layers, one layer being composed largely of lead and the other layer being composed largely of zinc and silver, separately removing said layers, removing the zinc by distillation from the layer composed of zinc and silver whereby the residue is composed largely of silver with relatively small amounts of lead, oxidizing the lead to form litharge, and re-smelting said litharge for the further desilverization thereof.

14. The process of recovering silver from a mixture of zinc, silver and lead which comprises melting said mixture in the presence of zinc chloride whereby metal oxides are dissolved and a slag is produced, allowing said slag to float upon the surface of said mixture whereby reoxidation of said metals is prevented, allowing said mixture to separate into two layers, one layer being composed largely of lead and the other layer being composed largely of zinc and silver, separately removing said layers, returning the layer composed largely of lead to a desilverizing process whereby any silver contained therein may be recovered, removing the zinc by distillation from the layer composed of zinc and silver whereby the residue is composed largely of silver with relatively small amounts of lead, oxidizing the lead to form litharge, and re-smelting said litharge for the further desilverization thereof.

15. The process of treating dross containing zinc, silver and lead which comprises melting said dross, adding zinc chloride thereto whereby any metal oxides present may be dissolved and caused to form a slag, allowing the molten dross to separate into two layers, the upper layer being composed largely of zinc and silver with small amounts of lead and the lower layer being composed largely of lead with small amounts of zinc and silver, separating said layers, removing the zinc from said upper layer by distillation whereby the zinc may be driven off as a vapor, removing lead from the residue after distillation by smelting said residue and passing oxidizing gases thereover whereby litharge is formed, further treating the litharge for the recovery of any silver therein, and removing the residue composed principally of silver.

16. The process of treating dross containing zinc, silver and lead which comprises melting said dross, adding zinc chloride thereto whereby any metal oxides present may be dissolved and caused to form a slag, allowing said slag to float upon the surface of said dross whereby re-oxidation of said metals is prevented, allowing the molten dross to separate into two layers, the upper layer being composed largely of zinc and silver with small amounts of lead and the lower layer being composed largely of lead with small amounts of zinc and silver, separating said layers, removing the zinc from said upper layer by distillation whereby the zinc may be driven off as a vapor, removing lead from the residue after distillation by smelting said residue and passing oxidizing gases thereover whereby litharge is formed, further treating the litharge for the recovery of any silver therein, and removing the residue composed principally of silver.

17. The process of treating dross containing zinc, silver and lead which comprises melting said dross, adding zinc chloride thereto whereby any metal oxides present may be dissolved and caused to form a slag, allowing said slag to float upon the surface of said dross whereby re-oxidation of said metals is prevented, allowing the molten dross to separate into two layers, the upper layer being composed largely of zinc and silver wth small amounts of lead and the lower layer being composed largely of lead with small amounts of zinc and silver, separating said layers, removing the zinc from said upper layer by distillation whereby the zinc may be driven off as a vapor, recovering said vapor and re-utilizing said zinc in the further formation of dross, removing lead from the residue after distillation by smelting said residue and passing oxidizing gases thereover whereby litharge is formed, further treating the litharge for the recovery of any silver therein, and removing the residue composed principally of silver.

18. The process of treating dross containing zinc, silver and lead which comprises melting said dross, adding zinc chloride thereto whereby any metal oxides present may be dissolved and caused to form a slag, allowing said slag to float upon the surface of said dross whereby re-oxidation of said metals is prevented, allowing the molten dross to separate into two layers, the upper layer being composed largely of zinc and silver with small amounts of lead and the lower layer being composed largely of lead with small amounts of zinc and silver, separating said layers, removing the zinc from said upper layer by distillation whereby the zinc may be driven off as a vapor, recovering said vapor and re-utilizing said zinc in the further formation of dross, removing lead from the residue after distillation by smelting said residue and passing oxidizing gases thereover whereby litharge is formed, allowing said litharge to float upon the surface of said molten residue, removing the litharge from said surface, further treating the litharge for the recovery of any silver therein, and removing the residue composed principally of silver.

19. The process of treating dross containing zinc, silver and lead which comprises melting said dross, adding zinc chloride thereto whereby any metal oxides present may be dissolved and caused to form a slag, allowing said slag to float upon the surface of said dross whereby re-oxidation of said metals is prevented, allowing the molten dross to separate into two layers, the upper layer being composed largely of zinc and silver with small amounts of lead and the lower layer being composed largely of lead with small amounts of zinc and silver, separating said layers, smelting said lower layer whereby the zinc present therein will assist in the formation of a dross composed of lead, zinc and silver, re-treating said dross for the recovery of silver therefrom, removing the zinc from said upper layer, removing lead from the residue by smelting said residue and passing oxidizing gases thereover whereby litharge is formed, allowing said litharge to float upon the surface of said molten residue, removing the litharge from said surface, further treating the litharge for the recovery of any silver therein, and removing the residue composed principally of silver.

20. The process of treating dross containing zinc, silver and lead which comprises melting said dross, adding zinc chloride thereto whereby any metal oxides present may be dissolved and caused to form a slag, allowing said slag to float upon the surface of said dross whereby re-oxidation of said metals is prevented, allowing the molten dross to separate into two layers, the upper layer being composed largely of zinc and silver with small amounts of lead and the lower layer being composed largely of lead with small amounts of zinc and silver, separating said layers, smelting said lower layer whereby the zinc present therein will assist in the formation of a dross composed of lead, zinc and silver, re-treating said dross for the recovery of silver therefrom, removing the zinc from said upper layer by distillation whereby the zinc may be driven off as a vapor, condensing and recovering said vapor and re-utilizing said zinc in the further formation of dross, removing lead from the residue after distillation by smelting said residue and passing oxidizing gases thereover whereby litharge is formed, allowing said litharge to float upon the surface of said molten residue, removing the litharge from said surface, further treating the litharge for the recovery of any silver therein, removing the residue composed principally of silver, and further refining said silver.

In testimony whereof I have hereunto set my hand.

BERRY MARVEL O'HARRA.